(12) United States Patent
Herbert

(10) Patent No.: US 10,148,223 B2
(45) Date of Patent: Dec. 4, 2018

(54) CAPACITOR BASED AUTOMOBILE BATTERY WITH BACKUP LIFEPO CHARGING SYSTEM AND CHARGING CIRCUIT

(71) Applicant: Nicholas Charles Herbert, San Bernardino, CA (US)

(72) Inventor: Nicholas Charles Herbert, San Bernardino, CA (US)

(*) Notice: Subject to any disclaimer, the term of this patent is extended or adjusted under 35 U.S.C. 154(b) by 16 days.

(21) Appl. No.: 15/385,752

(22) Filed: Dec. 20, 2016

(65) Prior Publication Data
US 2017/0194903 A1    Jul. 6, 2017

Related U.S. Application Data

(60) Provisional application No. 62/275,571, filed on Jan. 6, 2016.

(51) Int. Cl.
| | |
|---|---|
| *H02J 7/00* | (2006.01) |
| *H02S 40/38* | (2014.01) |
| *H02J 7/35* | (2006.01) |
| *H01M 10/0525* | (2010.01) |
| *H01M 4/58* | (2010.01) |
| *H01M 10/42* | (2006.01) |
| *H01M 10/46* | (2006.01) |
| *H02J 7/34* | (2006.01) |
| *H01M 16/00* | (2006.01) |

(52) U.S. Cl.
CPC .......... *H02S 40/38* (2014.12); *H01M 4/5825* (2013.01); *H01M 10/0525* (2013.01); *H01M 10/4257* (2013.01); *H01M 10/4264* (2013.01); *H01M 10/465* (2013.01); *H01M 16/00* (2013.01); *H02J 7/0026* (2013.01); *H02J 7/0042* (2013.01); *H02J 7/345* (2013.01); *H02J 7/355* (2013.01); *H01M 2220/20* (2013.01); *Y02E 60/122* (2013.01)

(58) Field of Classification Search
CPC . H02J 7/35; H02J 7/355; Y02E 60/12; H01M 10/465; H01M 16/006
USPC ........................................................ 320/101
See application file for complete search history.

(56) References Cited

U.S. PATENT DOCUMENTS

| | | | |
|---|---|---|---|
| 7,786,620 B2 | 8/2010 | Vuk | |
| 8,581,557 B2 * | 11/2013 | Kanoh | .................... H02J 7/345 320/118 |

(Continued)

FOREIGN PATENT DOCUMENTS

CN       203660585        6/2014

*Primary Examiner* — Arun C Williams
(74) *Attorney, Agent, or Firm* — Mu P.C.

(57) ABSTRACT

A Capacitor based Automobile Battery with backup LiFePo charging system and charging circuit is disclosed. This invention improves on existing energy start modules (ESM) in that it is designed as a full standalone replacement unit. This invention has a built in LiFePo battery, with charging circuit, that keeps capacitors charged at all times. The invention uses a novel design of activated carbon or graphene capacitors. There are no heavy lead plates or high levels of toxic acid that is used in AGM (absorbent glass mat}/Lead acid batteries. The invention is lightweight compared with standard lead or lithium cell automobile batteries. This invention holds energy longer than ESM's. The LiFePo battery is safer than standard LiFePo batteries.

10 Claims, 8 Drawing Sheets

(56) References Cited

U.S. PATENT DOCUMENTS

| | | | | |
|---|---|---|---|---|
| 2008/0026269 A1* | 1/2008 | Shurtleff | ............ | H01M 8/04007 429/414 |
| 2009/0302681 A1* | 12/2009 | Yamada | .................... | H02J 7/35 307/46 |
| 2010/0129703 A1* | 5/2010 | Caumont | ................. | H01G 2/04 429/120 |
| 2011/0189533 A1* | 8/2011 | Reis | .................... | H01M 2/1077 429/178 |

* cited by examiner

CAPACITOR BASED AUTOMOBILE BATTERY WITH BACKUP LIFEPO CHARGING SYSTEM AND CHARGING CIRCUIT

CROSS-REFERENCE TO RELATED APPLICATION

The present application claims priority to U.S. Provisional Patent Application No. 62/275,571 filed on Jan. 6, 2016, entitled "A Capacitor Based Automobile Battery With Backup LiFePo Charging System And Charging Circuit" the entire disclosure of which is incorporated by reference herein.

BACKGROUND OF THE INVENTION

1. Field of Invention

The present invention relates to the field of automobile batteries.

2. Description of Related Art

Problem Solved: The problems solved are; of high toxicity, excessive weight, slow charge rate and time, of standard lead acid automobile batteries. The problem of capacitor based engine start modules (ESM) that discharge quickly, lack of serviceability and lack of internal recharge ability is addressed.

Problems with standard lead/acid car batteries include the use of corrosive acid and high concentrations of toxic lead as components. These batteries frequently leak acid, and create acidic corrosion that damages components. Capacitor based systems do not have an internal battery to maintain a charge in the super capacitors when the vehicle is at rest, and due to self-discharging nature of capacitors, leak energy while at rest, leaving the capacitors with a low charge unable to start the engine system. Standard lead batteries have a short life cycle and are slow in charging. Standard auto batteries are also extremely heavy. The excessive weight of lead acid and other batteries in this field increase transportation fuel costs to market, and storage costs.

Lithium ion batteries have had a history of overheating causing them to fail or combust.

Current ESM units are not designed as a standalone replacement battery, and other capacitor units are merely jump-start units that require recharging from AC connections outside the vehicle, or assistance from a companion lead acid battery. ESM modules include super capacitors that are laser welded in place, because of this design, the entire unit must be replaced if a single or multiple super capacitors fail. This invention includes a novel serviceable super capacitor array utilizing novel capacitor terminal blocks that allow for the repair or replacement and expansion of parts within the device by someone skilled in the art.

This invention improves on existing energy start modules (ESM) in that it is designed as a full standalone replacement unit. This invention has a built in Lithium Iron Phosphate (LiFePo) battery, with charging circuit, that keeps capacitors charged at all times. The invention uses a novel design of a serviceable super capacitor array that allows individual capacitors to be replaced when required. There are no heavy lead plates or high levels of toxic acid that is used in AGM (absorbent glass mat)/Lead acid batteries. The invention is lightweight compared with standard lead or lithium cell automobile batteries. This invention holds energy longer than ESM's. The LiFePo battery is safer than standard LiFePo batteries. Through a novel method of serviceability, this invention allows for single or multiple super capacitor replacement in the event one or more super capacitors fail, or modified when a higher capacitance is required by the application.

Based on the foregoing, there is a need in the art for a single battery unit that works on its own as a replacement battery for automobiles, and is easily serviceable in the event components fail. Further, the device should reduce toxicity, weight, and charge time compared to traditional automobile batteries.

SUMMARY OF THE INVENTION

An energy storage device comprises a first and second terminal in communication with a lithium iron phosphate (LiFePo) internal charging batter. The LiFePo battery has a charging protection circuit wherein the LiFePo battery is electrically connected between the first and second terminal. One or more capacitors are electrically in communication by the top which releasably engages a dual capacitor terminal. Electrical connections can be made in series, or series parallel depending on the specific application of the energy storage device.

In an embodiment, a battery case has a lower case, a battery base, and an upper case. The battery base is disposed within the lower case and the top case.

The dual capacitor terminal block comprises a dual terminal deck, having two or more terminal housings. Each of the terminal housings are negative female bullet connectors that releasably engage male bullet connectors. Further, the dual capacitor block comprises two or more dual terminal conductive leads that insertably mount into the dual terminal housings. A charging protection circuit sealably engages the dual terminal conductive leads and the dual terminal deck, placing the dual terminal block in electrical communication with the one or more capacitors. In an embodiment, the dual terminal block has two or more conductive lead openings configured to receive the dual conductive terminal lead inserts.

In an embodiment, one or more screws sealably engage the charging protection circuit, the two or more dual terminal conductive lead inserts, and the dual terminal deck.

The capacitor may be made of a number of materials known in the art, most notably graphene, or activated carbon.

In an embodiment, the dual capacitor terminal block is made of non-conductive material, having a diameter equivalent to the diameter of the one or more capacitors, having a thickness of 4 mm.

In an embodiment, the device is in communication with a solar array, wherein the device is an energy storage device for the solar array.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
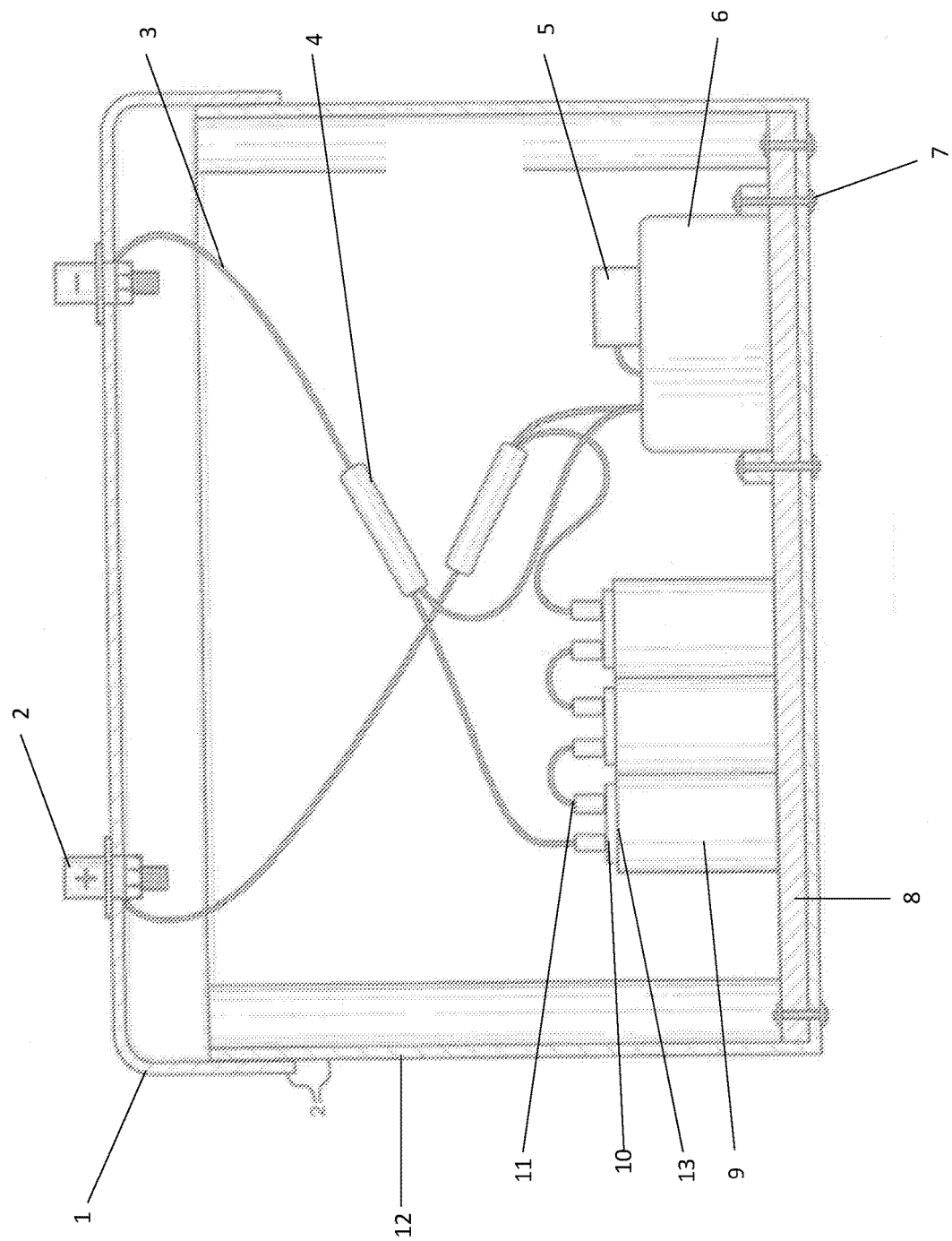
FIG. 1 is a side plan view of the battery, according to an embodiment of the present invention.

Preferred embodiments of the present invention and their advantages may be understood by referring to FIGS. 1-8, wherein like reference numerals refer to like elements.

As stated above, high toxicity, excessive weight, slow charge rate and charge time of standard lead acid automobile batteries is an area where the technology can be improved. The invention claimed here solves these problems.

The Graphene/Activated Carbon based capacitors in the invention solves the high toxicity issue by utilizing a more environmentally friendly array of Graphene and/or activated carbon based capacitors instead of lead plates and sulfuric acid. This invention solves the weight problem in standard lead cell batteries through the use of these lightweight capacitors, and a small LiFePo battery. The invention is far lighter than a standard lead cell automobile battery. Using Graphene or activated carbon capacitors solves the slow charge rate problem of lead acid batteries. These materials allow the battery to charge in seconds rather than hours. This invention can provide higher cycle rates, and faster charging times.

This invention is an improvement on what currently exists. This invention is unique to other capacitor battery systems or engine start modules (ESM) through the novel use of a serviceable array of graphene enhanced or carbon based super capacitors and a LiFePo backup battery that keeps the capacitors charged when the vehicle is at rest. Other capacitor based systems and engine start modules (ESM) must work in tandem with another lead acid battery and are designed to accentuate the system. This invention is a replacement for a lead acid automobile battery as the vehicle's alternator recharges it while the vehicle is running. When the vehicle is at rest, the LiFePo battery in the system keeps the capacitors charged and ready to provide energy to start the vehicle. The main problem with existing capacitor based energy devices is that it functions on a charge-load/discharge-recharge cycle. The typical existing systems are depleted by the discharge when a load, or repeated loads, are applied. Engine start modules (ESM) function in a similar manner, in that if the discharge caused the unit to fall below a useable voltage, the device will not function.

The novel mechanism this invention utilizes incorporates a LiFePo battery that is attached to the capacitors array's positive and negative leads, and maintains a constant charge on the array while the system is at rest. This internal battery is recharged from the alternator when the engine is running. When a load is applied, such as in the event the engine is started, the super capacitors are fully charged and ready to provide the required energy. The invention also contains a built in charging circuit on each super capacitor in the array as well as a charging circuit that regulates the charge from the alternator in a vehicle to the LiFePo internal charging battery. No exterior charging connections are required as in other units. The weight of a standard lead acid automobile battery currently in this field ranges from 35 lbs to 53 lbs and higher. This invention weighs approximately 5 lbs. It is the lightest auto battery in its field.

Lead acid batteries are using a technology that is over 155 years old. Standard lead acid batteries leak, and produce an acidic powdered corrosive material on terminals and connectors. These batteries may also contain liquid and gelled sulfuric acid and other acids and chemical combinations that are highly toxic. They are difficult to service. Standard batteries take hours to charge and lead/acid batteries, are heavy. Energy Start Modules (ESM) are not designed to completely replace existing batteries. Capacitor based ESM's cannot hold energy for long periods of time without recharging.

This invention improves on existing energy start modules (ESM) in that it is designed as a full standalone replacement unit. This invention has a built in LiFePo battery, with charging circuit, that keeps capacitors charged at all times. The invention uses a novel design of serviceable activated carbon or graphene assisted super capacitors. Each capacitor has a novel capacitor terminal block that allows a person skilled in the art to repair and replace individual parts of the system. There are no heavy lead plates or high levels of toxic acid that is used in AGM (absorbent glass mat) lead acid batteries. The invention is lightweight compared with standard lead or lithium cell automobile batteries.

This invention holds energy longer than ESM's. The LiFePo battery is safer than standard LiFePo batteries.
The Version of the Invention Discussed Herein Includes:
 1. Graphene/Activated Carbon Capacitors
 2. Lithium Iron Phosphate Battery
 3. Specific Voltage Charging Circuit (LiFePo Battery)
 4. Specific Voltage Protecting Circuit (Super Capacitors)
 5. Battery Lower Case
 6. Battery Upper Lid
 7. Dual Connection Capacitor Block
 8. Battery Post Positive/Negative
Relationship Between the Components:

Each graphene or activated carbon capacitor obtains a constant charge from a lithium iron phosphate (LiFePo) battery when the current from a car alternator is not discharging current. In a preferred embodiment, the system uses six screwtop 2.25 volt super capacitors connected in series or series parallel allowing for a nominal voltage of 13.5 volts. Each super capacitor is connected with bullet style quick disconnect connectors, built into the capacitor dual terminal block on the top of each capacitor. This novel design allows for the removal and installation of replacement parts if any super capacitor fails. This allows for the disclosed invention to be fully repairable and serviceable, and substantially lighter and simpler than prior art that utilizes 12 capacitors that are laser welded in place. The charging current flowing to the LiFePo battery when the vehicle is running is regulated by a specific voltage charging circuit built into the LiFePo battery when a current from the alternator is present. When the vehicle draws from item the graphene activated carbon capacitor and the LiFePo battery, the specific voltage charging circuit limits the discharge of the LiFePo battery to a specific voltage of between 12.6 and 14.6v or as designed for specific application. Wire connectors are American Wire Gauge (AWG) wire or custom designed connector (PCB or Metal Connector) for specific purpose that carries current to each capacitor wired in series or series-parallel. Wire connectors (shown in wire form) carries charging current and discharging from both the graphene activated carbon capacitors and the LiFePo battery up to positive and negative battery. The entire battery system is placed into a battery case consisting of a bottom case and top seal with nonconductive silicone sealant.

In reference to FIG. 1, the battery assembly is shown in series configuration embodiment. The case comprises a battery base 8, lower case 12, and upper case 1. The battery base 8 supports the capacitor array 9. Each capacitor has a dual capacitor terminal block 10 mounted on a top 13 of each capacitor. Bullet connectors 11 allow for quick release of the AWG wiring 3 that connects the capacitors to each of the battery terminals 2. Internal wire connectors 4 conjoin wiring from the LiFePo battery 6, capacitor array 9, and each of the terminals. The LiFePo battery is held in place by rivets 7 to ensure it remains in place during use.

Figure 2:
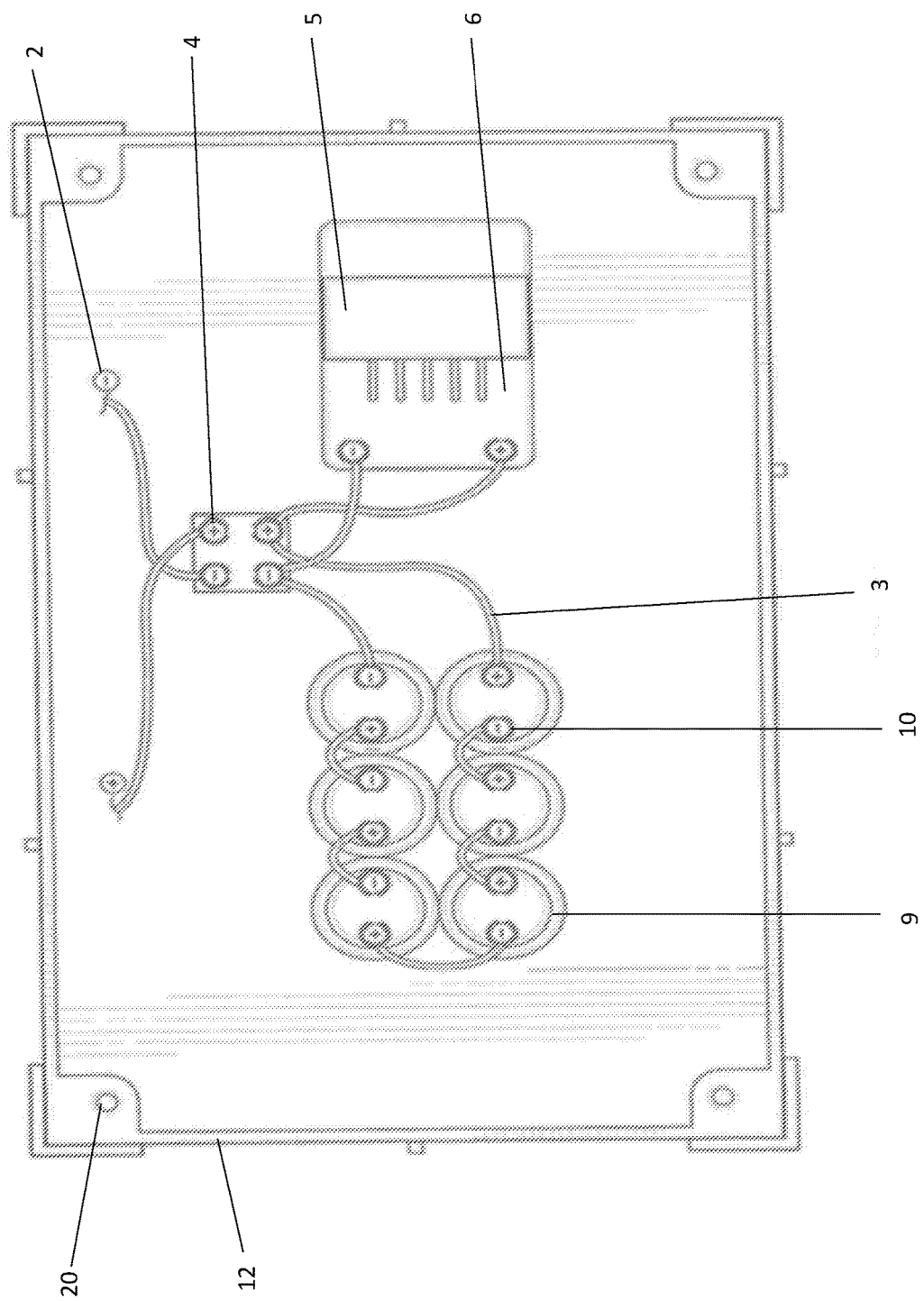
FIG. 2 is a top plan view of the battery, according to an embodiment of the present invention.

In reference to FIG. 2, a series configuration is shown. Screw connectors 20 anchor the upper case 1, to the lower case, enclosing the inner battery components. The battery and its components can be serviced by disengaging the screws to remove the upper case 1. The battery is able t function in series (pictured) or series parallel.

Figure 3:
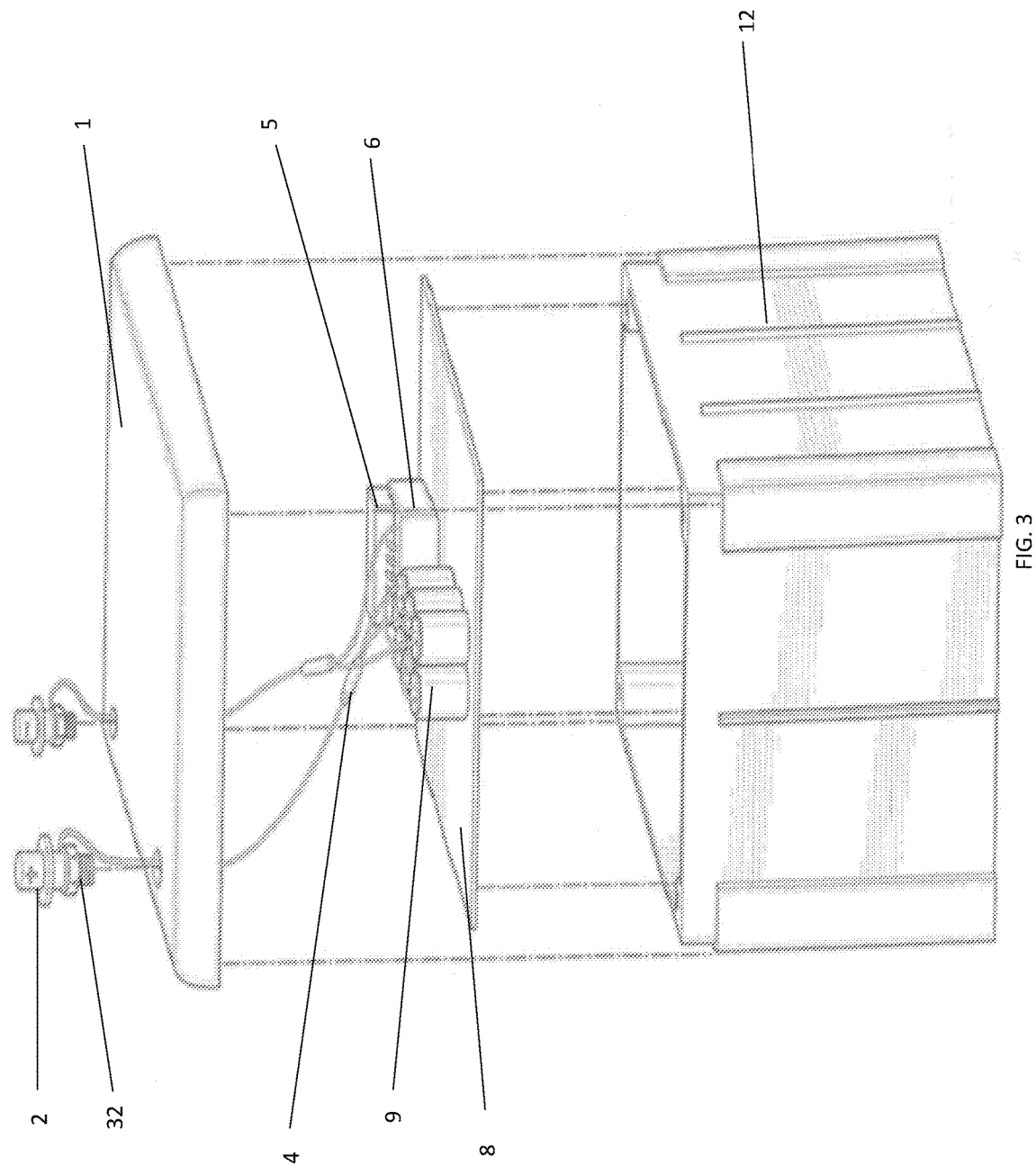
FIG. 3 is a perspective view of the battery, according to an embodiment of the present invention.
Figure 4:
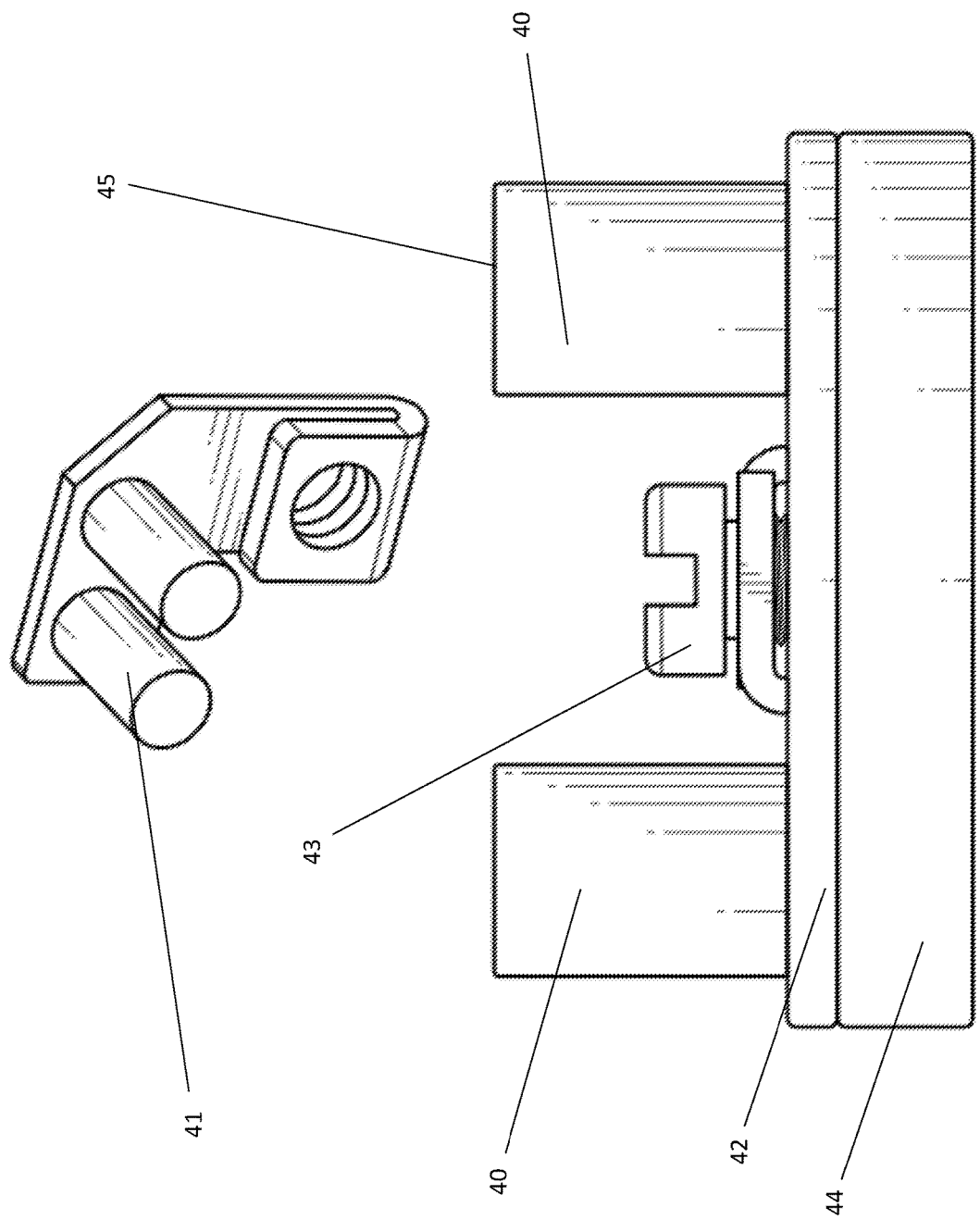
FIG. 4 is an exploded plan view of the capacitor dual terminal block, according to an embodiment of the present invention.
Figure 5:
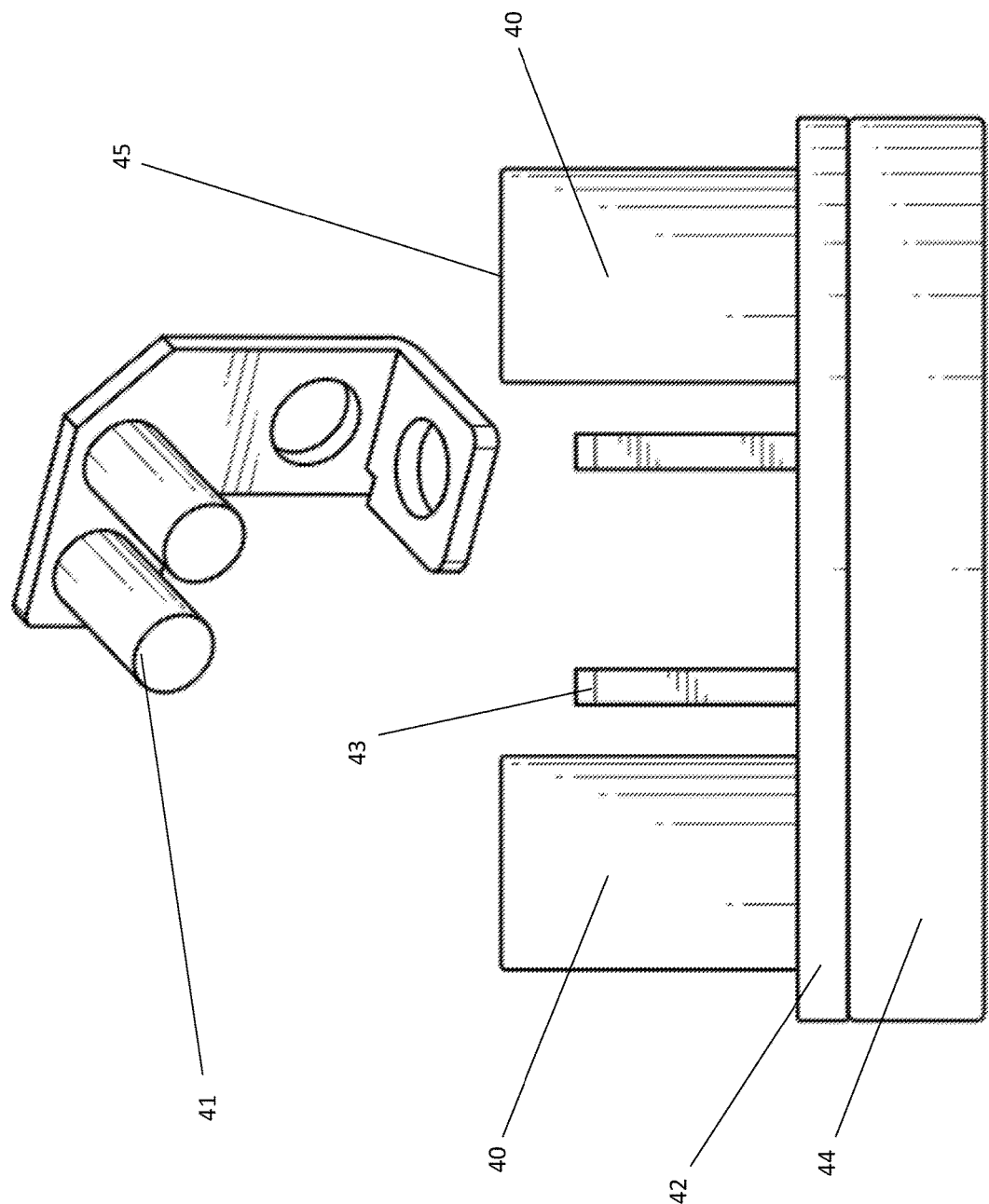
FIG. 5 is an exploded plan view of the capacitor dual terminal block, according to an embodiment of the present invention.
Figure 6:
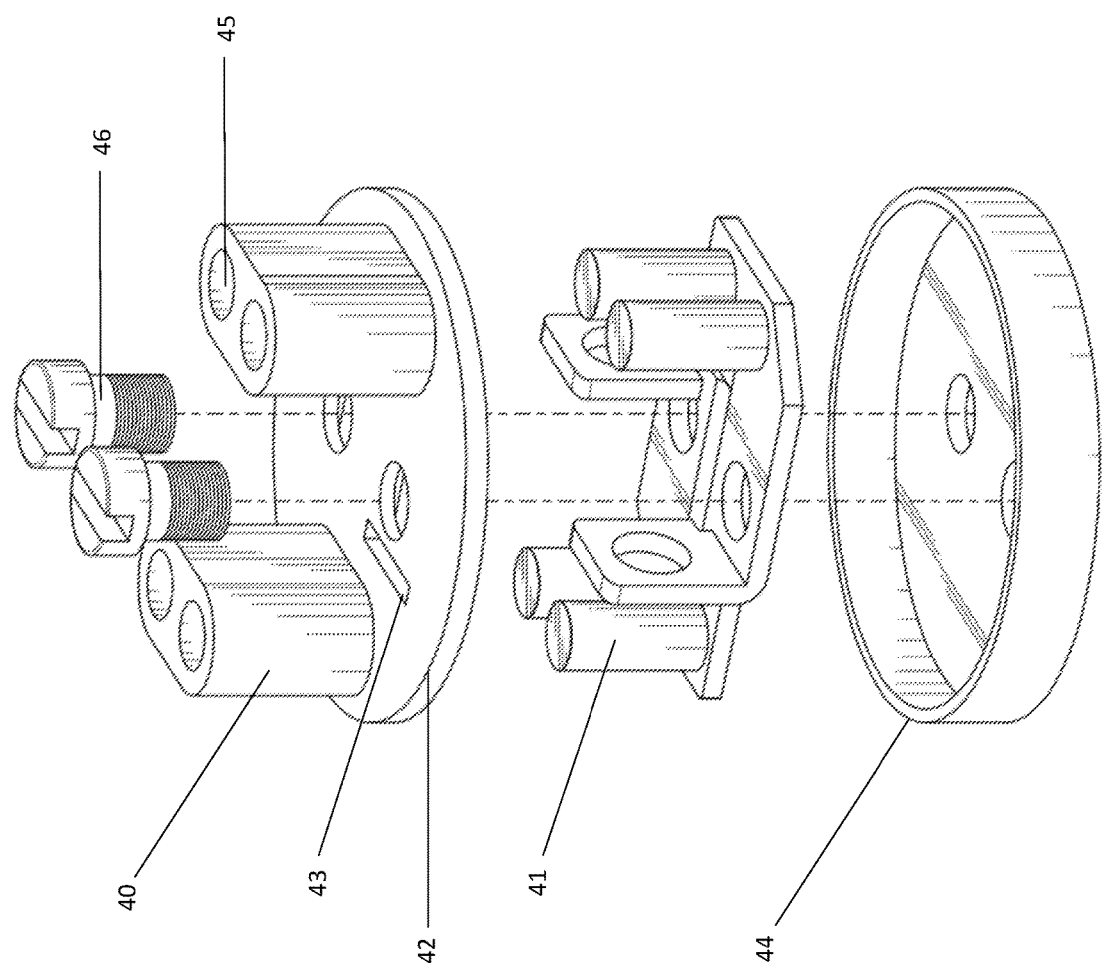
FIG. 6 is an exploded view of the capacitor dual terminal block, according to an embodiment of the present invention.
Figure 7:
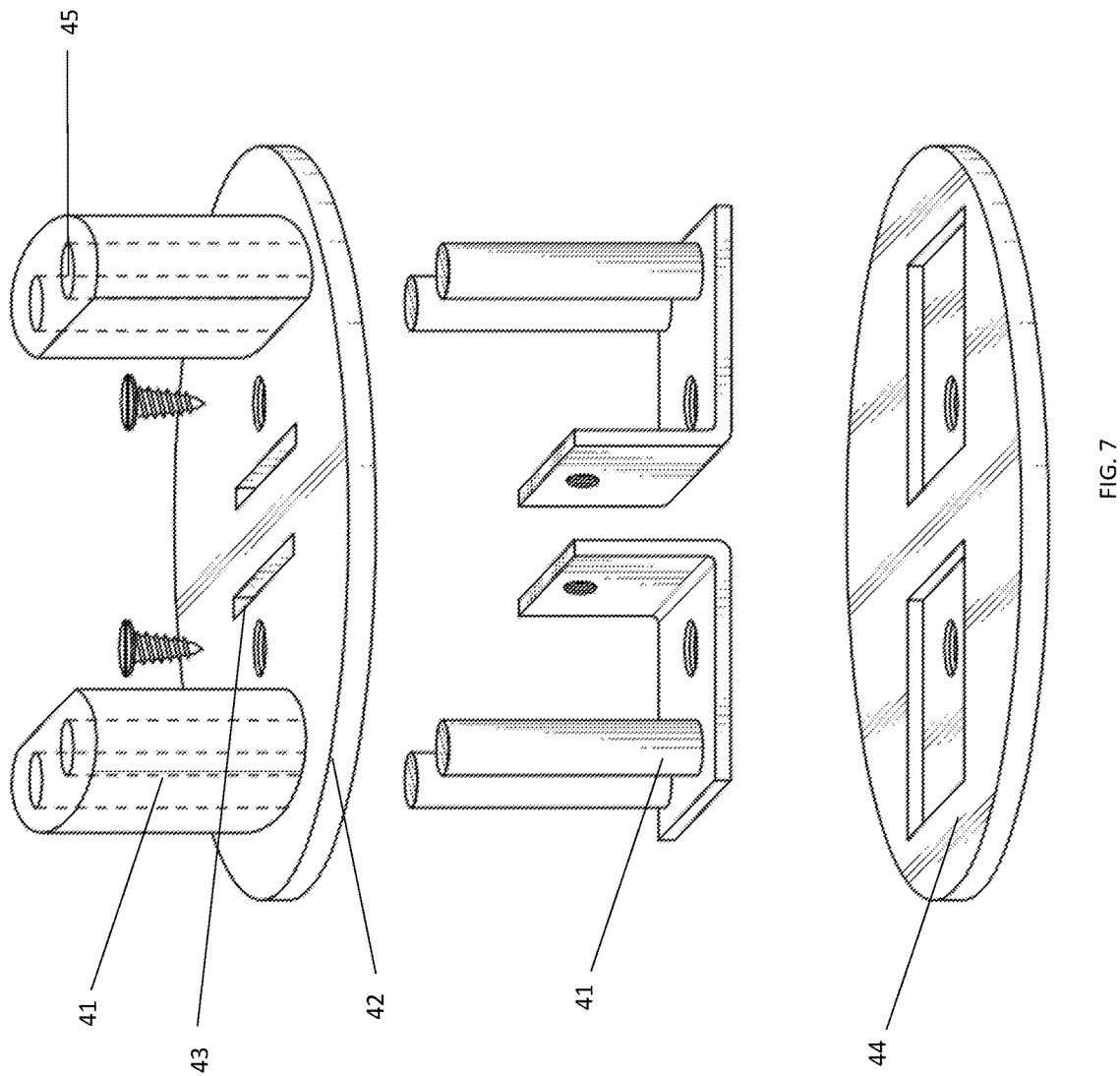
FIG. 7 is an exploded view of the capacitor dual terminal block, according to an embodiment of the present invention.
Figure 8:
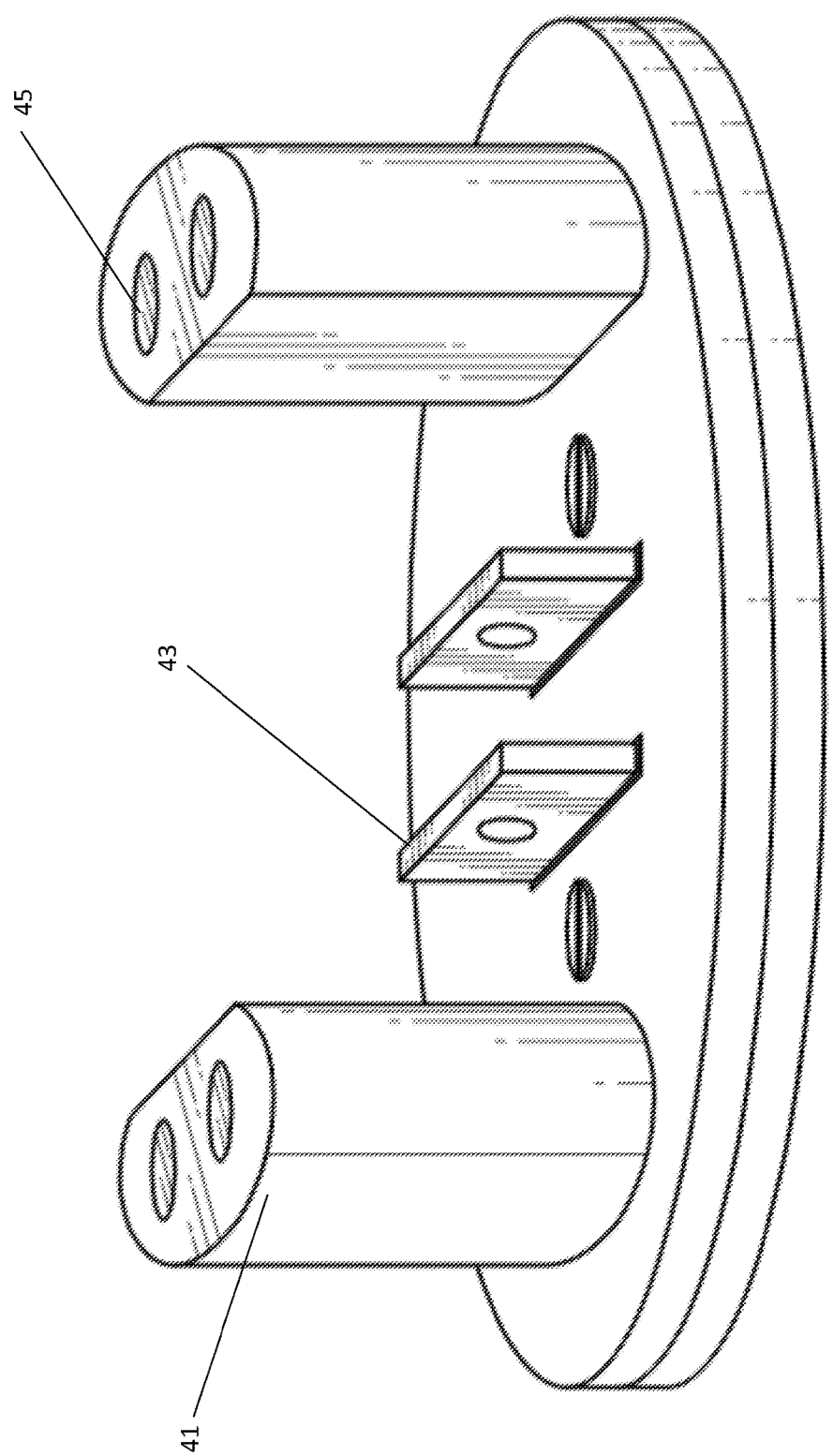
FIG. 8 is a front elevation view of the capacitor dual terminal block, according to an embodiment of the present invention.

In reference to FIG. 3, an exploded view of the battery, showing the upper case 1, battery base 8, and lower case 12 housing the inner battery components. AWG wiring 3 is connected by terminal connectors 32 the to the battery terminals 2 as known in the art.

In reference to FIGS. 4-8, explosions views of the capacitor dual terminal blocks are shown. In an embodiment, a charging protection circuit 44 forms the base and is mounted to the capacitor array. Dual terminal conductive lead inserts are positioned between the charging protection circuit 44 and a dual terminal deck 42. Each dual terminal conductive lead insert 41 comprises two inserts 41 which are insertably mounted into a dual terminal housing 40 positioned on the dual terminal deck 42. Screws 46 affix the dual terminal deck 42 to the charging protection circuit 44 once the dual terminal conductive lead inserts 41 are inserted into the dual terminal housings 40. Each screw allows for the dual terminal block to be disassembled and serviced at any time. Bullet connectors 11 (in FIG. 1) are insertable into the apertures of the dual terminal housing 40.

How the Invention Works:

After the ignition is turned on, the starter draws current from the graphene or activated carbon capacitors and LiFePo battery allowing the engine to start.

The charging current originates from the vehicle alternator and flows to the external positive and negative battery posts on the battery case at a variable rate according the vehicle alternator design. Inside the battery, the current flows to a limiting/protection charging circuit, where the charging current for LiFePo is regulated to a maximum charging voltage as required by specific application. The current then flows to a LiFePo battery. The current flows from LiFePo battery to the Graphene or Activated carbon Capacitors at a specific voltage as required by the application. Each super capacitor has an individual charging protection circuit mounted at the terminal end of each super capacitor, located below the capacitor dual terminal block, which regulates the charging of the individual super capacitor. The LiFePo backup system keeps the cells charged when alternator is not creating electrical current, and system is at rest. The dual terminal block allows for series or series parallel configuration, and includes two quick release bullet connection on the top of the terminal block that enable one skilled in the art to service, repair, and replace the super capacitors. When there is a draw on the cells while engine is on, current flows from the super capacitor array to the engine system to provide energy. Through the internal connections to the battery posts, out the battery posts and to the vehicle electrical system.

The super capacitor array provides a burst of current to start the automobile, and the LiFePo battery maintains a current flow for onboard systems, and capacitors when the system is at rest.

The specific voltage charging circuit regulates voltage to a specific voltage as required by each application on this invention. If voltage is higher than threshold voltage, as required by the application, the circuit shuts down charging. The protection circuits in each super capacitor terminal block regulate charge to each super capacitor in a similar manner.

How to Make the Invention:

Step 1. Manufacture a Super Capacitor Dual terminal Block. The dual capacitor terminal block may be constructed of a non-conductive material such as ABS plastic. The diameter of the deck should be the same as the diameter of any super capacitor in the array, and have a thickness of approximately 4 mm. There should be two positive female bullet connectors and two negative female bullet connectors. This feature allows for both Series and Series parallel configurations. The super capacitor dual terminal block comprises of a round upper deck with two positive and two negative female connections. Two conductive metal contacts are inserted through the bottom of the round upper deck into the positive and negative connectors. The two conductive contacts may be constructed for screwtop capacitors or pin design capacitors. Finally a lower deck is attached through an overmolding process, sealing the contacts inside the terminal block. The super capacitor dual terminal block may be manufactured through a plastic injection mold process, overmolding, 3D printing, or a poured mold process.

Step 2. Connect six, 500 farad or higher farad value, 2.25v super capacitors, or a capacity and voltage capacitor combination suitable for a specific application, to individual circular charging protection boards, positive to positive, negative to negative and secure capacitor dual terminal blocks on top of each capacitor. Connect a dual female bullet style terminal connector to both positive and negative leads on LiFePo internal battery. One connection on the dual female lead is utilized by capacitor array, and the second is connected to the battery terminals leading to the upper lid terminals. In the case of a 6 super capacitor configuration, create 7 internal jump connectors utilizing 7 sections of 10 AWG wire (or wire rated for a specific application) and 14 male bullet style terminal connectors. Attach 2 male bullet connectors to each jumper. Additional jump connections are required if additional capacitors are used. Connect one positive leads from the Dual female connector on the LiFePo internal battery to the negative lead on first (1) super capacitor utilizing a male/male jumper. A manufacturer of this invention may use super capacitors or ultra capacitors with a voltage and farad capacity as required by application. AWG wire jumpers must be in accordance with the proposed system amperage and voltage. A printed circuit board (PCB) or other metal connectors may be utilized as required for specific an application to connect the capacitor array in a series or series/parallel. Connectors, PCB, and jumper wire must be rated for voltage and amperage used in the application of this invention. For a series-parallel configuration, use the remaining open connections on the capacitor terminal blocks and connect all positive and negative terminals in parallel. Connect the open positive lead on the dual connector coming from the LiFePo internal charging battery to parallel positive on the capacitor array, and the open negative lead to the negative parallel lead on the capacitor array.

Step 3. Attach a positive terminal from capacitor (1) to a negative terminal on capacitor (2) and continue connections in a series until a final connection of the positive terminal on (6) capacitor to a fully charged LiFePo battery at a voltage and capacity required by the application. The LiFePo internal charging battery must include a charging protection circuit that regulates charging rate and voltage such that a maximum incoming voltage is equal to the maximum rating on the LiFePo battery.

Step 4. Place the Super Capacitor Array into the capacitor sleeve mounts on the Battery Base. This step may be done prior to all steps if desired. Each capacitor is then secured to the capacitor sleeve mount with electronic grade silicone. A 4 point securing technique around each capacitor in the array is sufficient. Place a ¼" in diameter deposit of silicone at the area at which the capacitor terminal block and the capacitor sleeve mount meet. These securing points may be removed and the array serviced by those skilled in the art.

Step 5, Create the battery terminal connections. Cut 2 10 AWG wires to a length of 7 inches stripping a 1.5" area on each end.

Step 6. Attach a male bullet connector to one end of each 10 AWG wire, or wire appropriate for the application and voltage. Insert these wires into the remaining Positive, and Negative female dual bullet leads on the LiFePo internal charging battery.

Step 7. Securing the array. Utilizing a plastic injection molding process, manufacture a base for the super capacitor array and internal charging battery. The size and design of the battery base will vary with each application, number of super capacitors, and size of internal charging battery will dictate mold specifications. In the preferred embodiment a base of ABS plastic is molded to fit 6 super capacitors each 34 mm in diameter, 60 mm in height, spaced at 2 mm intervals, two rows of 3 with allowance for capacitor sleeve mounts 2 mm in thickness molded into the base. A space with molded clips to hold the 12.6v LiFePo battery is included in design. Once manufactured and the completed super capacitor array is secured to the base, this base is then lowered into the lower battery case, and the base is riveted to the lower case in a 6 rivet pattern one at each corner, and one rivet in the middle of each side.

Step 8. Manufacture of a plastic nonconductive housing or case for the battery components according to the size and rating of the battery being manufactured is required. Battery case sizes and terminal configuration includes but is not limited to sizes recognized by The Battery Council International (BCI). The plastic injection molded case should have a press in style fastener system, in which male fasteners through the upper lid into a metal female component to insure proper seal. A non-conductive gasket may be used to further seal the upper lid to the lower case. Obtain commercially available lead or manufacture custom conductive metal positive and negative battery terminals. Zinc terminals are used in the preferred embodiment. Include terminals in the plastic injection molding process of the upper lid. Attach 10AWG or a gauge specific to the application, to internal positive and negative to terminals that extend inside the upper lid. Install a female bullet connector on each wire. Connect these wires, positive and negative, to male power connector plug coming from the capacitor array.

Step 9. Drill holes to accommodate the shank and madrel of a pop rivet in the bottom of the battery case. These rivets secure the baseboard to the bottom of the case and rivet the baseboard to the case.

Step 10. Apply high quality silicone to the lid edges, close and screw the upper case lid shut.

All elements of this invention are necessary. Varied sizes of capacitors and LiFePo battery can be utilized to achieve higher energy output. This system is scalable in voltage and capacitance for use in large truck, aircraft or other vehicles according to energy needs by increasing the number or size of capacitors and LiFePo Battery. Other rechargeable battery types' backups could be used with the capacitor bank.

A printed circuit board can be used to connect the capacitor bank in series and series/parallel. The capacitors used cam be activated carbon or graphene based capacitors, or another type of capacitor such as aluminum electrolyte.

The Graphene or Activated carbon capacitors may be substituted for Aluminum capacitors, or other high-energy output capacitors as known in the art.

How to Use the Invention

Step 1. A person using the invention would install the invention in a vehicle according to the power requirements of the vehicle and in the same manner one would install a standard lead acid battery. The voltage and amperage of this invention may be constructed to meet specific requirements for each vehicle and use. Larger vehicles such as trucks, aircraft, and spacecraft may require a more powerful version of the invention. The user must check the rating on the battery and match it to the vehicle or application in which the invention is being installed or used. To use the invention, the user must connect the positive terminal to the positive lead coming from the vehicle or application, and the Negative terminal of the invention to the Negative lead coming from the vehicle or application. The invention is used in the same fashion one would use a standard automobile battery.

Additionally, a large scale version of the invention may be used in a solar array to store energy, wind turbine systems or other energy generating systems where a rechargeable supercapacitor system is required. Smaller versions may be motorcycles, or any vehicle with an alternator/generator charging system.

Due to the lightweight quality of the invention, military and spacecraft applications are viable areas of use for this invention as the battery can receive charging current from solar collectors or a Peltier device.

The graphene/active carbon capacitor bank can be serviced if the capacitors overload and fail, or malfunction in some way. In prior art, if a capacitor fails the entire unit fails. This feature also allows for the unit to be expandable, whereas prior art is not. Novel modular connectors enable the serviceability of the capacitors, whereas prior art has laser welded capacitors that cannot be serviced.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. An energy storage device comprising:
   a. a first and second terminal;
   b. a lithium iron phosphate internal charging battery, having a battery charging protection circuit, wherein the lithium iron phosphate internal charging battery is electrically connected between the first and second terminal;
c. one or more capacitors, having a top; and
d. a dual capacitor terminal releasably engaged to the top, the dual capacitor terminal comprising a dual terminal deck, the deck having two or more terminal housings, the dual capacitor terminal further comprising two or more dual terminal conductive lead insert, the dual capacitor terminal further comprising a charging protection circuit sealably engaged to the dual terminal deck,
wherein each of the two or more terminal housings are negative female bullet connectors configured to releasably engage two or more male bullet connectors, wherein each of the two or more dual terminal conductive lead inserts insertably mount into the dual terminal housings, and wherein the one or more capacitors are in electrical communication with the battery.

2. The device of claim 1, having a battery case comprising:
a. a lower case;
b. a battery base disposed within the lower case; and
c. an upper case positioned atop the lower case, wherein the first and second terminal are positioned through the upper case.

3. The device of claim 1, wherein the one or more capacitors are electrically connected in series-parallel.

4. The device of claim 1, having two or more conductive lead openings, configured to receive the dual conductive lead inserts.

5. The device of claim 1, having one or more screws sealably engaging the charging protection circuit, the two or more dual terminal conductive lead inserts, and the dual terminal deck.

6. The device of claim 1, wherein the capacitor is a graphene capacitor.

7. The device of claim 1, wherein the capacitor is an activated carbon capacitor.

8. The device of claim 1, wherein the dual capacitor terminal block is made of non-conductive material.

9. The device of claim 8, wherein the dual capacitor terminal block has a diameter equivalent to a diameter of one of the one or more capacitors, wherein the thickness is 4 mm.

10. The device of claim 1, wherein the device is in communication with a solar array, wherein the device is an energy storage device for the solar array.

* * * * *